May 5, 1936.  M. GARBELL  2,039,527
PLATFORM SCALE
Filed May 14, 1934  2 Sheets-Sheet 1
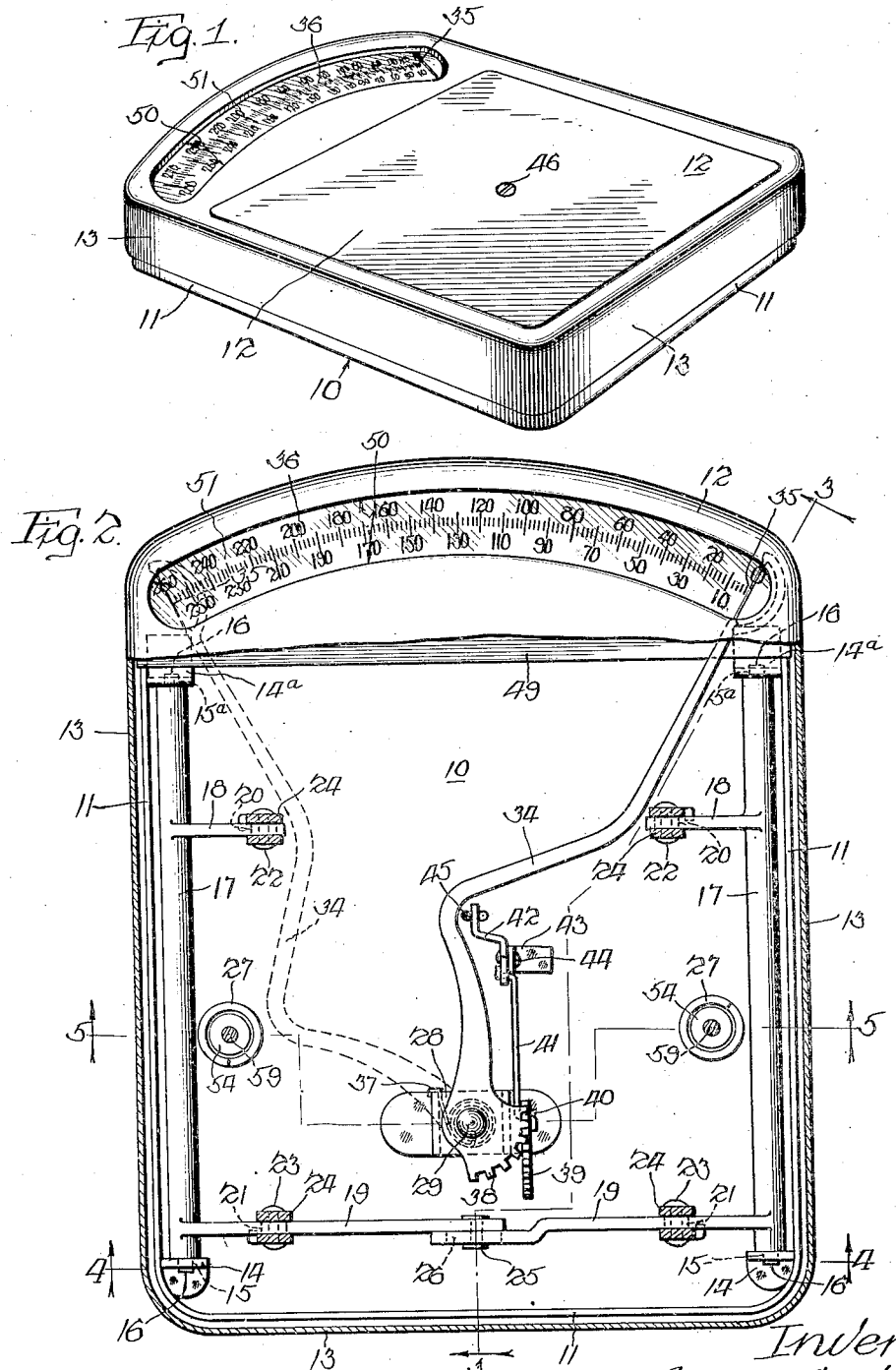

May 5, 1936. M. GARBELL 2,039,527
PLATFORM SCALE
Filed May 14, 1934 2 Sheets-Sheet 2
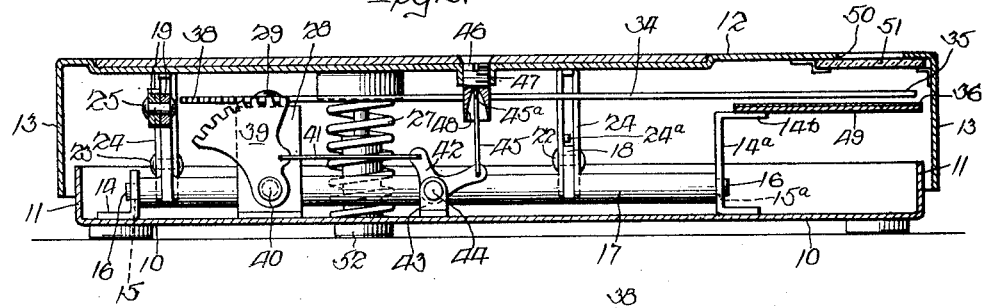
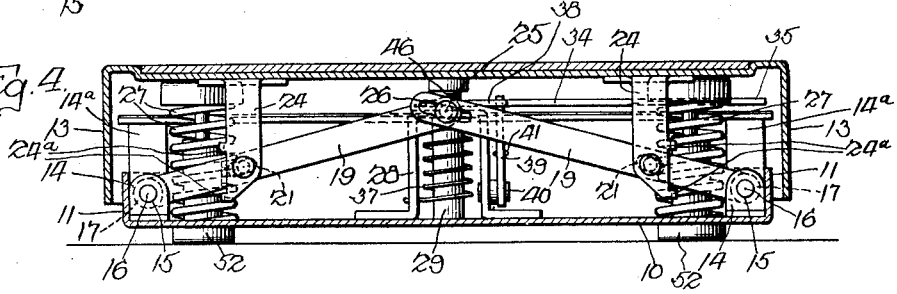
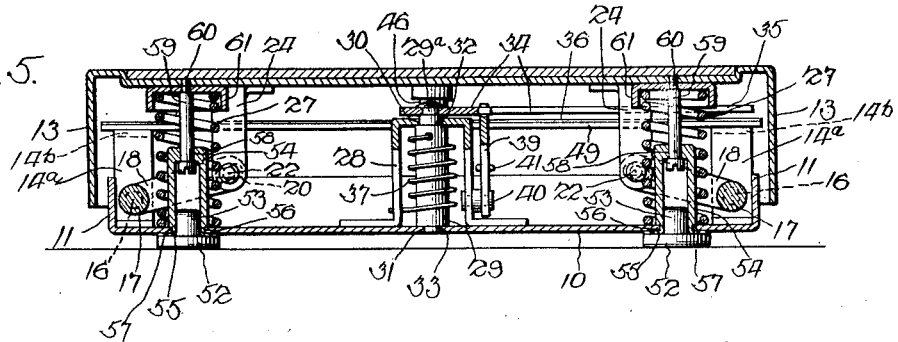
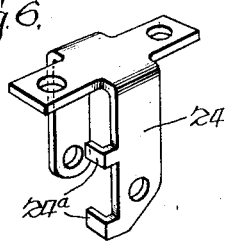
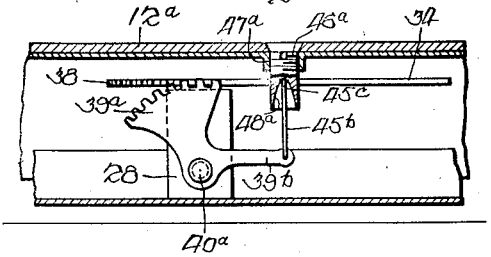
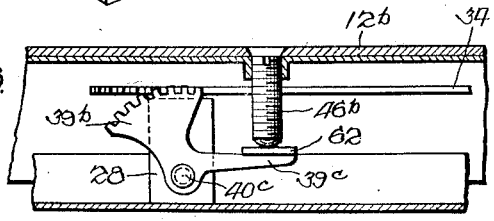
Inventor:
May Garbell
By [signature] Atty.

Patented May 5, 1936

2,039,527

UNITED STATES PATENT OFFICE 2,039,527

PLATFORM SCALE

Max Garbell, Chicago, Ill., assignor to Victor Adding Machine Company, Chicago, Ill., a corporation of Delaware Application May 14, 1934, Serial No. 725,449

9 Claims. (Cl. 265—68)

The invention relates to a scale and concerns more particularly the bathroom type of scale adapted for use in the accurate weighing of individuals.

The chief objects of the invention are the provision of a scale that is inexpensive to manufacture, compact and simple in construction and assembly utilizing a few parts for making the same while retaining its accuracy and efficiency to insure the proper functioning thereof.

A further object is the provision of a scale having equalizing means therein for retaining the platform thereof in parallel relation with its base providing means whereby the weight may be positioned at any portion of the platform and the correct weight thereof will be had.

A still further object is the provision of a scale wherein the indicator is positively moved to indicate the weight placed thereon and yieldingly restored to its normal position when the weight is removed therefrom.

And a still further object is the provision of a scale having means normally retaining the platform thereof in elevated position and means coacting therewith for retaining the platform parallel with a minimum amount of strain exerted to the operating parts for providing a uniform and balanced movement of said platform.

Other and further objects will be set forth in the ensuing description and claims; and referring to the drawings:—

Figure 1 is a perspective view of my improved scale.

Figure 2 is a top plan sectional view of the scale showing a portion thereof in elevation.

Figure 3 is a longitudinal sectional view taken on the line 3—3 of Fig. 2.

Figure 4 is a cross-sectional view taken on the line 4—4 of Fig. 2.

Figure 5 is a cross-sectional view taken on the line 5—5 of Fig. 2.

Figure 6 is a detail perspective view of one of the brackets carried on the platform of the scale for securing the same to the equalizing means.

Figure 7 is a modified form illustrating the bellcrank segment having an upwardly extending link attached thereto which connects the platform therewith for causing the swinging movement of the indicator.

Figure 8 is a modified form similar to Fig. 7 wherein the adjusting screw is in direct contact with the leg of the bell-crank.

The scale comprises a base 10 having an upwardly extending flange 11 therearound and a platform 12 provided with a downwardly extending flange 13 therearound adapted to loosely surround the flange 11 of the base 10. The base 10 is provided with a plurality of L-shaped ears 14 and 14a which may be welded or otherwise secured in pairs to the base adjacent the flanges 11 and which are provided with openings 15 and 15a respectively therein adapted to receive the trunnions 16 of a rockable member 17 supported in each pair of L-shaped ears 14 and 14a. The rockable members 17 are each provided with inwardly extending arms 18 and 19 respectively, which as shown, may be an integral part of the member 17 and which are provided with elongated openings 20 and 21, respectively, adapted to receive the pins 22 and 23 therein which also extend through a U-shaped bracket 24 secured to the platform 12. The brackets 24 are each provided with inwardly extending ears 24a adapted to engage the top and underneath edge of the arms 18 and 19 when positioned thereon for retaining the bracket substantially vertical while assembling the platform with the base. These ears 24a are provided on one side edge of the brackets 24 and are spaced a sufficient distance apart to permit of a free movement of either of the arms 18 and 19 therebetween when the same is assembled and the scale is being operated. The feature which these two ears 24a provide are for the purpose of facilitating the assembling, namely, supporting the bracket relatively vertical for the positioning thereof to secure the same to the platform.

The arms 19 of the member 17 extend inwardly a greater distance than the arms 18 so as to overlap each other, and are connected together midway between the trunnions 16 thereof by means of a pin 25 secured to one of the arms 19 while freely fitting into a slot opening 26 in the other arm 19 providing a compensating means for permitting a rocking movement of these two members 17 on their trunnions 16 while being attached together at 25.

The purpose of attaching the members 17 as above mentioned, is for providing a uniform movement of the platform 12 with respect to its base 10 regardless of where the weight may be placed on the platform.

To normally retain the platform 12 in normal raised position with respect to the base 10, I provide the compression springs 27 which are preferably positioned midway between the arms 18 and 19 of the members 17 and inwardly thereof for normally exerting a tension about midway of the length of the platform on which a person may stand. These springs 27 are aligned transversely of the base 10 and platform 12 of the scale and the weight of the person thereon may easily tend to exert a rocking movement thereof, which rocking movement is absorbed to a parallel movement by means of the connections 22 and 23 of the brackets 24 fixed to the platform 12 and which are connected to the arms 18 and 19 of the members 17.

The brackets 24 on the platform 12 form a cradle support with the members 17 and by means of these members 17 being connected at 25, will cause them to rock on their trunnions 16 and in parallel relation with the base 10.

About centrally of the longitudinal axis of the base 10, a substantially U-shaped bracket 28 is secured to the base which forms a pivotal center for a vertically extending stud 29 which extends through the bore 30 thereof and into a bore 31 in the base 10. The stud 29 is provided with a reduced portion near each end thereof forming the shoulders 32 and 33 respectively which retain the stud 29 pivotally positioned between the bracket 28 and the base 10. The free upper end of the stud 29 is provided with a shoulder 29a that has an indicator arm 34 fixed thereto which extends substantially horizontally to the forward end of the scale being provided with the usual indicating means 35 at its free end portion. This indicator 34 is normally retained with its indicating means 35 toward zero position of a graduated scale 36 by means of a torsion spring 37 having one end fixed to the vertical stud 29 with its body portion coiled therearound and with its other leg secured to the U-shaped bracket 28. The indicator arm 34 is provided with an integral toothed segment 38 concentric with the vertical stud 29 and which is in meshing engagement with a toothed segment 39 pivotally mounted for rocking movement on a stud 40 secured to one side of the U-shaped bracket 28. A connecting link 41 connects the segment 39 with a bell-crank 42, carried on a bracket 43 at 44 and which is provided with a link 45 connecting its other leg with the platform 12. The link 45 extends upwardly of the bell-crank 42 and is connected to the platform 12 by means of its contact with an adjustable screw 46 threaded at 47 into the platform 12 and which is provided with a pocket formation 48 into which the free end 45a of the link 45 extends.

As thus far described, the platform 12 is normally retained in spaced relation with the base 10 by means of the compression springs 27 interposed therebetween and by means of the connection of the platform and base through the members 17. The torsion spring 37 exerts a tension on the indicator 34 which normally retains the same toward the zero position of the graduated scale 36 and by means of its connection with the segment 39, the torsion spring 37 also exerts a tension on this segment which normally creates a pull on the link 41 connected thereto and to the bell-crank 42 which causes its other leg to carry the vertical link 45 therewith and retain the end 45a thereof into the pocket formation 48 of the set-screw 46 threaded into the platform 12.

To position the end 35 of the indicator 34 at zero position with respect to the normal position of the platform 12, it is only necessary to adjust the screw 46 which will in turn adjust the link 45 and bell-crank 42, and this adjustment will carry the link 41 and segment 39 therewith which is in meshing engagement with the toothed portion 38 of the indicator 34 and properly regulate the same with its free end 35 in the zero position with the graduated scale 36. Should the adjustment be made in either direction, the indicator will be positively driven upon the downward movement of the screw 46 and through the medium of its links, bell-crank and segments, and will be caused to move by means of the torsion spring 37 for its positioning when the screw 46 is threaded upwardly for adjustment.

It will be noted that with this construction, a positive movement of the indicator will be had when a weight is placed upon the platform 12 and the yieldable return of the indicator and associated parts will be had when the weight is removed therefrom so that as the weight is placed upon the platform, the positive movement of the indicator will be against the yieldable spring means which tends to stabilize the indicator for its proper positioning in accordance with the amount being weighed.

The graduated scale 36 is supported on a platform 49 which is carried on the ears 14b—14b of the brackets 14a—14a and which extends outwardly thereof under the end 35 of the indicator 34. The platform 12 is provided with an arcuate slot opening 50 which has a glass 51 secured to the underside thereof through which the graduated scale 36 and the end 35 of the indicator may be seen. The platform 49 is elevated some distance above the base 10 with the indicator movable thereabove in close proximity with the opening 50 in the platform 12 to permit of visibility and also providing a sufficient distance therebetween for a free movement of the platform when a weight is placed thereon.

As shown in Fig. 2, the springs 27 are preferably positioned intermediate the arms 18 and 19 of the member 17 and adjacent thereto for providing a uniform pressure between the platform 12 and the base 10, and to support the base 10 and the springs 27, I provide a foot or leg 52 which is adapted to carry a portion of the load placed on the platform 12 and to prevent the sagging or springing of the base 10. The foot 52 is preferably of rubber or other resilient material and is provided with a shank portion 53 adapted to extend into a tubular member 54 which is provided with a reduced portion 55 forming a shoulder 56 and adapted to extend through an opening 57 in the base 10 with the shoulder 56 thereof resting upon the base and its reduced portion 55 riveted or beaded to secure the tube 54 in fixed position. The tubular member 54 is provided with a reduced opening 58 at its upper end portion through which the shank of a relatively long screw 59 extends and is slidably mounted with the head thereof serving as a limit stop therefor while its other end is provided with a reduced threaded shank 60 which is threaded into the platform 12 and secures a cup-shaped spring retaining member 61 therewith. The compression spring 27 is guided at its upper end portion by means of the cup 61 and is also guided by means of the outer periphery of the tubular member 54 which it surrounds and having its lower end portion resting on the base 10. With this construction of spring support, a free and easy movement of the platform 12 will be had while retaining the same guided as a unit with the base 10.

As a weight is placed upon the scale, the platform 12 may be moved within its bounds depending upon the type of scale constructed, for example, should a weight be placed upon the scale that exceeds its maximum amount, the screws 59 will be slidably carried within the tubular members 54 until the heads thereof engage the shank portions 53 of the feet 52. These shanks 53 of the feet 52 serve as a cushion or abutment for limiting the downward movement of the platform 12 and preventing the parts from being distorted when an overload is placed upon the platform.

In the modified form illustrated in Fig. 7, the segment 39a is in the form of a bell-crank pivoted at 40a and having an integral leg 39b which has an upwardly extending link 45b with its free end 45c retained in a pocket 48a of a screw 46a threaded at 47a in the platform 12a.

With this construction, the link 41, bell-crank 42 and bracket 43 shown in the preferred form are omitted, and a direct connection between the platform 12a and the segment 39a may be had by means of the link 45b. The segment 39a is provided with teeth which engage the teeth 38 of the indicator 34 in the same manner as that shown in Fig. 2.

In either of these forms shown, it will be noted that the screw 46 in the preferred embodiment and 46a in the modified form are each provided with a relatively deep pocket formation 48 and 48a respectively which provides and assures a positive connection between the upstanding links and the platform without the possible tendency of the links becoming disengaged therefrom in the shipment of these scales, or while a person may step on or off rapidly.

In the modified form shown in Fig. 8, the bell-crank 39b is similar to that shown in Fig. 7 being pivoted at 40c having a leg 39c which is provided with an overturned portion 62 that forms a rest for the adjusting screw 46b that is threaded to extend through the platform 12b and in direct contact with this extension 62 of the leg 39c. As the platform 12b is moved downwardly, the screw 46b threaded therein will engage the leg 39c of the bell-crank segment 39 and cause a direct rocking movement thereof to cause a swinging movement of the indicator arm 34.

I contemplate as being included in these improvements all such changes, variations and departures from what is thus specifically illustrated and described as fall within the scope of the appended claims.

I claim:

1. A scale of the character described, comprising a base and a depressible platform carried in spaced relation therewith, springs yieldingly retaining the platform in spaced relation with the base, an indicator carried for swinging movements on the base, geared means including link connections forming positive driving means between the platform and the indicator in one direction of movement of the platform, and an adjustable means on the platform regulating the driving means for the indicator, said adjustable means being accessible through the platform for regulating the indicator.

2. A scale comprising a base having a platform carried in spaced relation therewith, spring means interposed between the base and the platform, an indicator on the base operatively connected to and movable upon the depression of the platform, spring means coacting with the indicator for restoring the same upon the release of said platform, arms pivotally supported on the base and having their free ends directed toward each other and being connected for movement one with the other, said platform being pivotally supported on said arms whereby upon depressing the platform a parallel movement thereof will be had with respect to the base.

3. A scale comprising a base and a depressible platform carried in spaced relation therewith, springs interposed between the base and the platform, indicating means supported on the base and operatively connected with and movable by the platform when depressed, and arm means pivotally connected together and extending in opposed directions and being connected with the platform and the base, said arm means guiding and retaining the platform in a horizontal plane with respect to said base.

4. A scale comprising a base and a platform carried in spaced relation therewith, an indicator pivotally carried on the base, means yieldingly retaining the indicator in normal position, means connecting the indicator with the platform whereby said indicator will swing horizontally against said last named means while the platform moves vertically, opposed arms pivotally carried on the base and operatively connected with each other, said arms being also pivotally connected with the platform and forming equalizer means that provide for a parallel movement of the platform with respect to the base.

5. A scale comprising a base and a depressible platform carried in spaced relation therewith, springs interposed between the base and the platform, an indicator carried on the base and operatively connected with the platform, said indicator being movable horizontally upon the depression of said platform, opposed arms pivotally carried on the base and operatively connected with each other, said arms being also pivotally connected with the platform and forming equalizer means that provide for a parallel movement of the platform when depressed with respect to said base.

6. A scale comprising in combination a base, a platform resiliently supported in spaced relation with the base, an indicator supported for swinging movements on the base and adapted to extend over a graduated scale carried in raised position on said base, of yieldable means retaining the indicator in zero position of the scale, said platform having an opening therein through which the indicator and scale is visible, geared means including link connections connecting the indicator with the platform, and telescoping means associated with the base and the platform, said telescoping means forming guide means and means for limiting the movement of said platform in either direction of its travel.

7. A scale comprising in combination a base, a platform, spring means between the base and the platform, an indicator pivotally carried for swinging movements on the base, geared means including connections operatively connecting the indicator with the platform, arms pivotally carried on the base and directed toward and connected for movement with each other, said platform being pivotally carried on the arms whereby upon the depression of the platform said arms form equalizing means for a parallel movement thereof with respect to the base.

8. A scale comprising in combination a base, a platform, spring means interposed between the base and the platform, an indicator pivotally carried for swinging movements on the base, geared means including connections operatively connecting the indicator with the platform, arms pivotally carried on the base and extending toward and pivotally connected with each other, the platform being pivotally carried on the arms for causing a rocking movement thereof upon the depression of the platform, said arms forming equalizer means for a parallel movement of the platform with respect to the base, and stop means coacting with the arms for limiting their upward movement with the platform against the normal tension of the spring means.

9. A scale comprising a base, a platform, springs interposed between the base and platform, an indicator carried for swinging movements on the base and being provided with segmental teeth, a segmental gear in meshing engagement with the segmental teeth of the indicator, means connecting the segmental gear with the platform for movement therewith to swing the indicator upon the depressing of the platform, and guide means associated with the platform and the base for guiding said springs, said guide means forming abutting means for limiting the downward movement of said platform when an overload is placed thereon.

MAX GARBELL.